Figure 1:
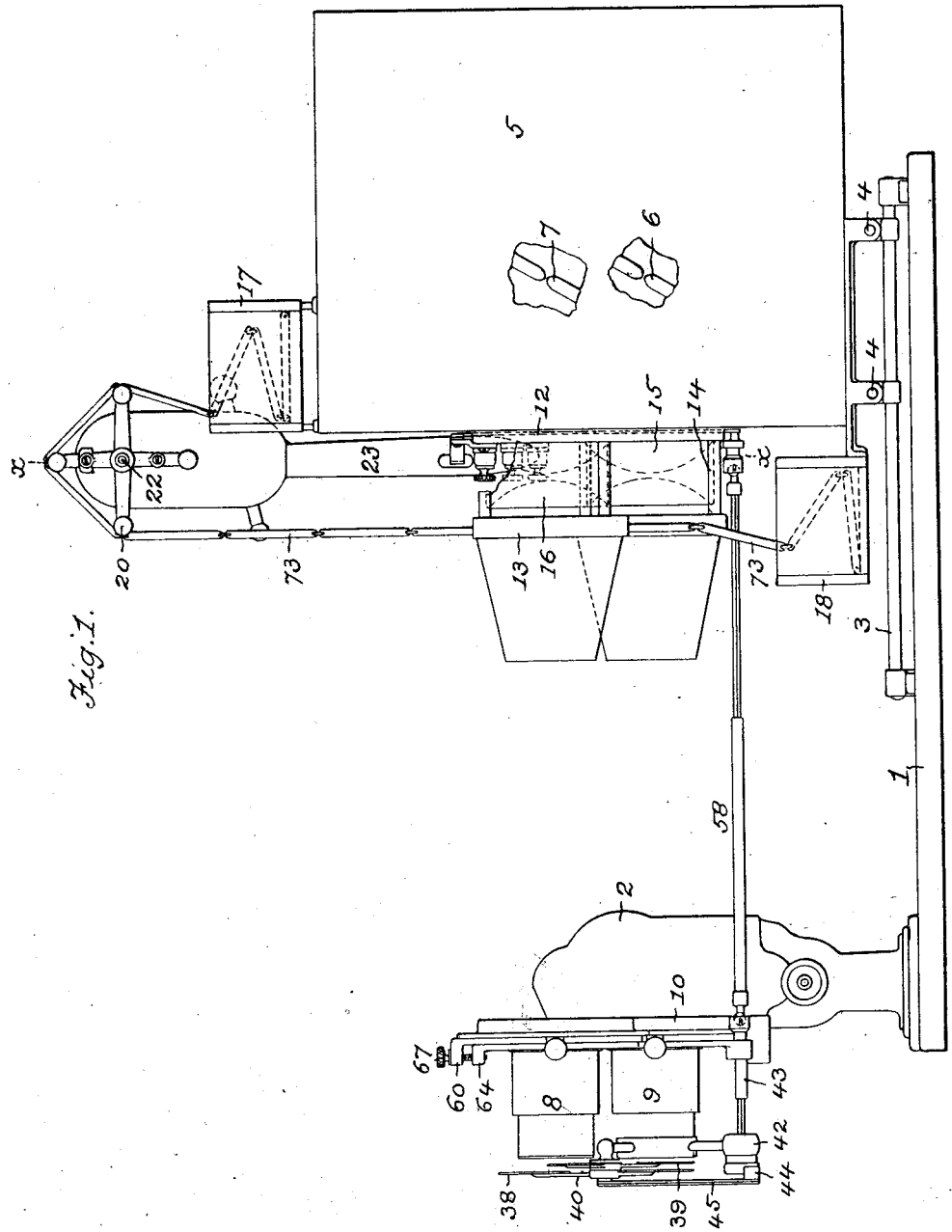

A. C. ROEBUCK.
OPTICAL PROJECTING APPARATUS.
APPLICATION FILED APR. 21, 1909.

1,060,128.

Patented Apr. 29, 1913.
6 SHEETS—SHEET 1.

Attest:
M. H. Holmes
Henry Mo...

Inventor:
Alvah C. Roebuck,
by Robert Burns, Atty.

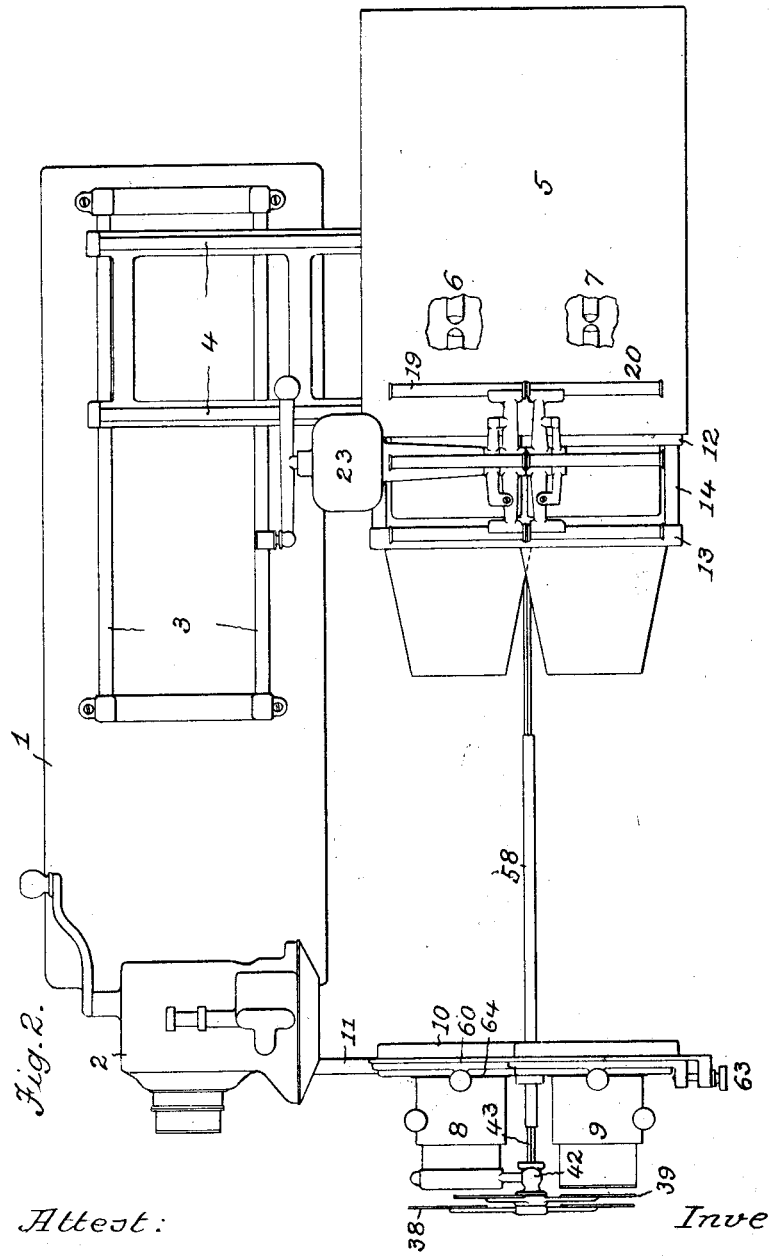

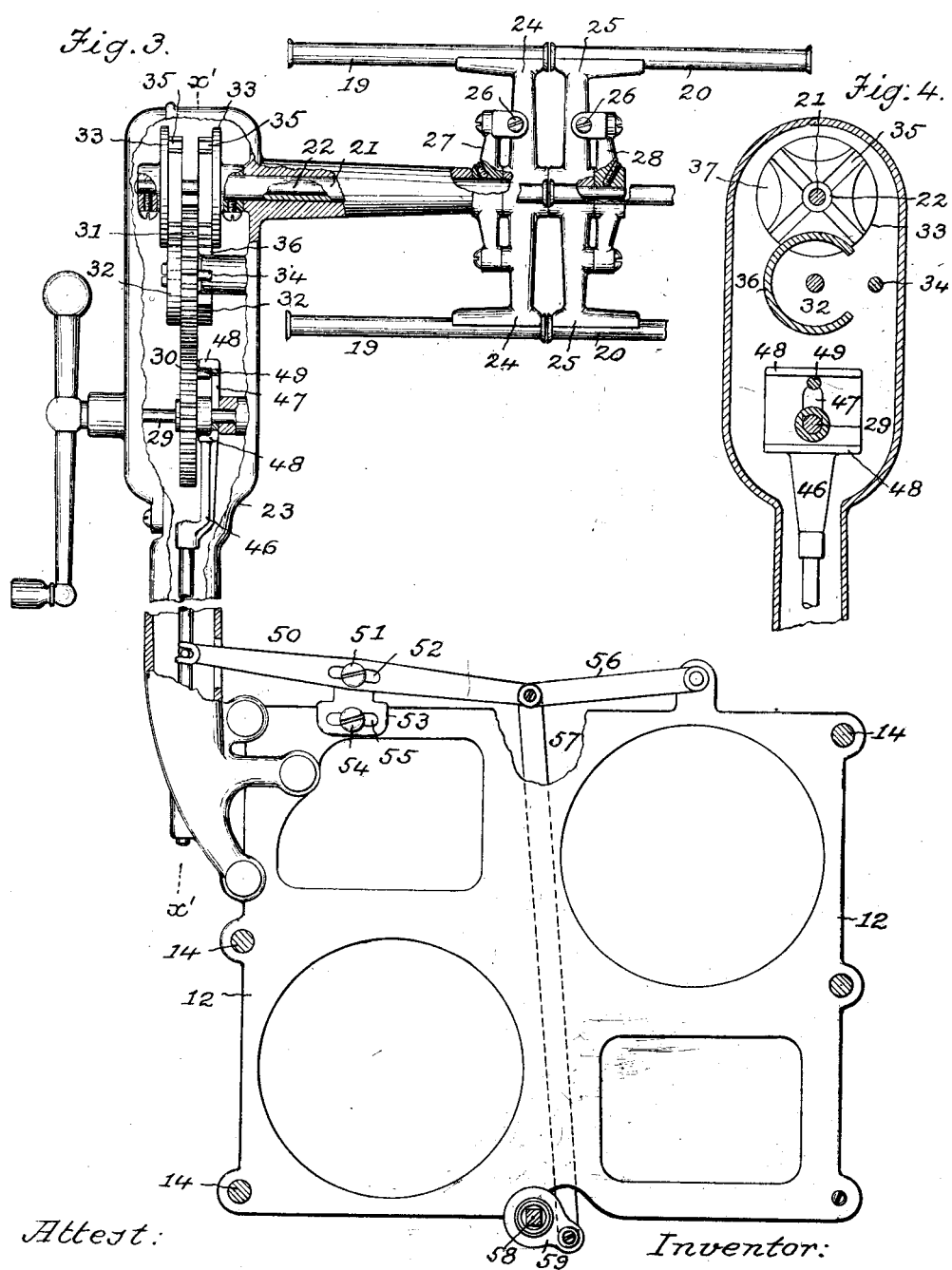

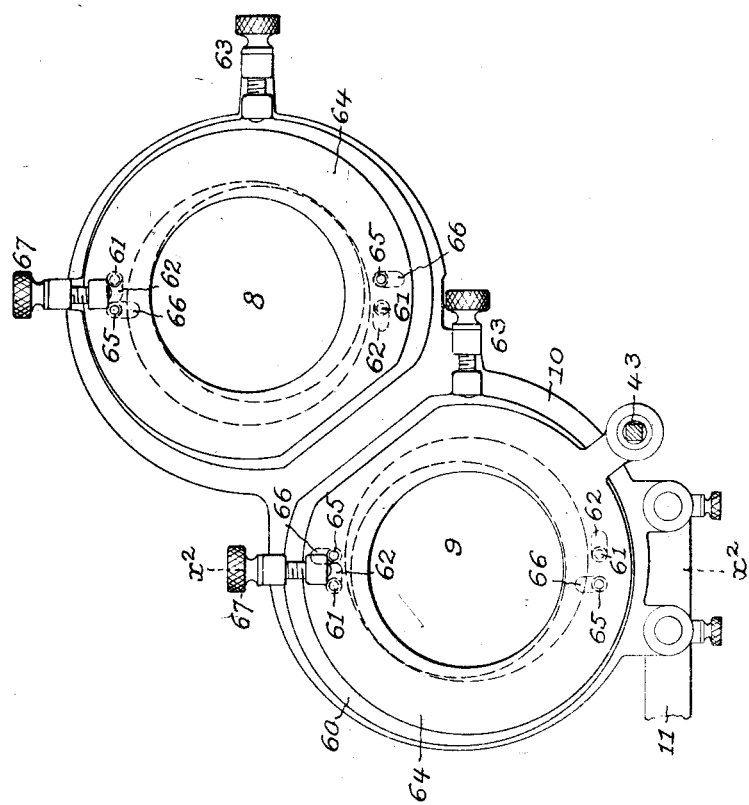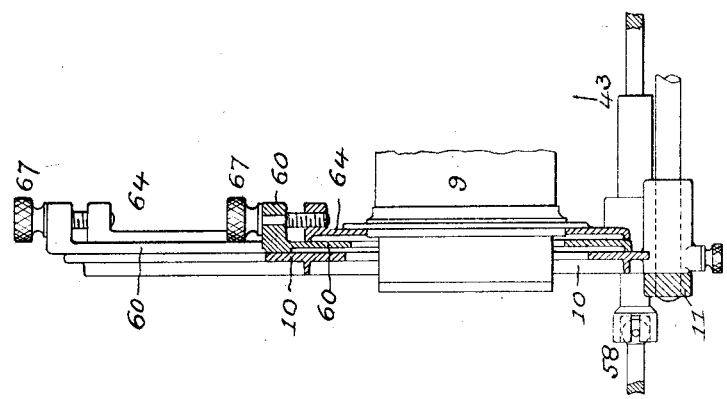

A. C. ROEBUCK.
OPTICAL PROJECTING APPARATUS.
APPLICATION FILED APR. 21, 1909.
1,060,128.
Patented Apr. 29, 1913.
6 SHEETS—SHEET 5.
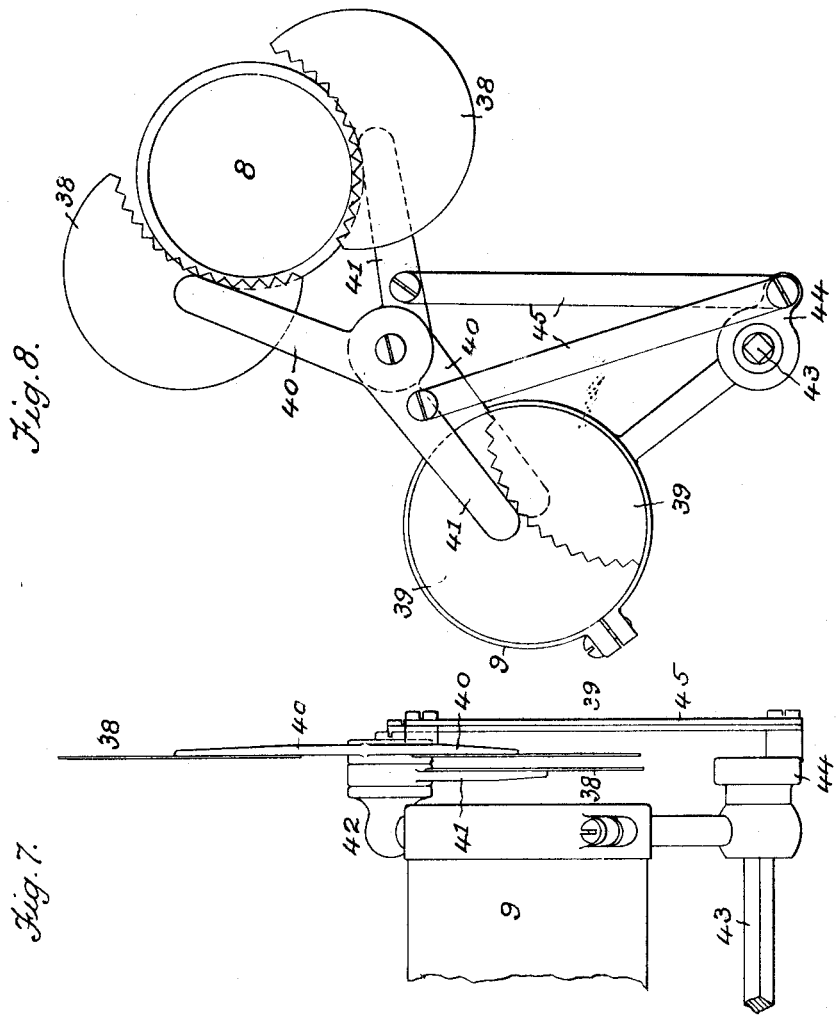
Attest:
M. H. Holmes.
Henry Moe.
Inventor:
Alvah C. Roebuck,
by Robert Burns Atty.

A. C. ROEBUCK.
OPTICAL PROJECTING APPARATUS.
APPLICATION FILED APR. 21, 1909.
1,060,128.
Patented Apr. 29, 1913.
6 SHEETS—SHEET 6.
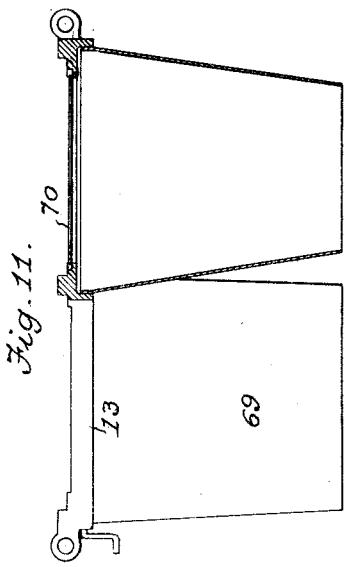
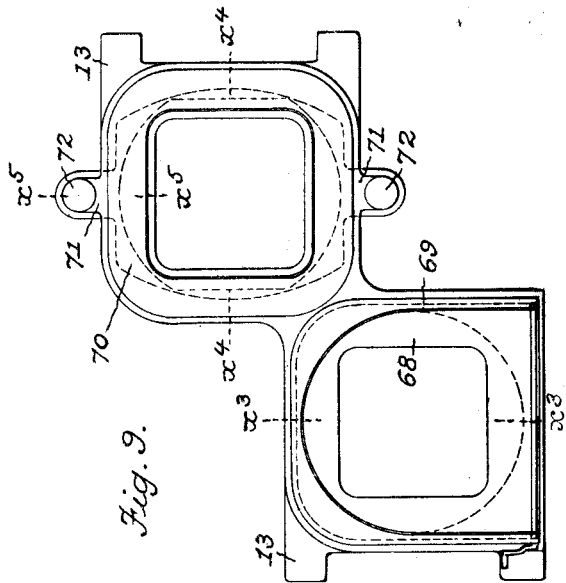
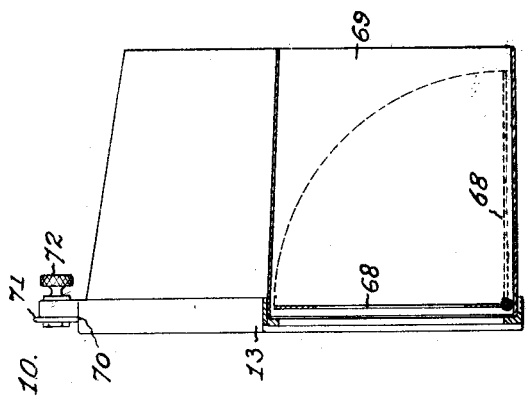
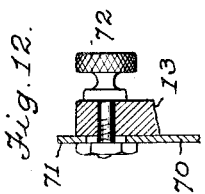
Attest:
M. H. Holmes.
Henry Moe.
Inventor:
Alvah C. Roebuck,
By Robert Burns, Atty.

UNITED STATES PATENT OFFICE.

ALVAH C. ROEBUCK, OF CHICAGO, ILLINOIS, ASSIGNOR TO THE ENTERPRISE OPTICAL MFG. COMPANY, OF CHICAGO, ILLINOIS, A CORPORATION OF ILLINOIS.

OPTICAL PROJECTING APPARATUS.

1,060,128.     Specification of Letters Patent.     Patented Apr. 29, 1913.

Application filed April 21, 1909. Serial No. 491,310.

*To all whom it may concern:*

Be it known that I, ALVAH C. ROEBUCK, a citizen of the United States of America, and a resident of Chicago, in the county of Cook and State of Illinois, have invented certain new and useful Improvements in Optical Projecting Apparatus, of which the following is a specification.

This invention relates to optical projecting apparatus of the combined kinetoscope and dissolving view steropticon type, and has for its various objects: to provide a simple and efficient arrangement and combination of parts with which a large number of lantern slides can be automatically manipulated and alternatively and successively shifted into line with the optical axis of the lantern, with an avoidance of an exhibition of the slides in wrong order, or with the views reversed or upside down. And with which the slides of a double optical lantern have alternate and successive movement and the required dissolving view effect attained by the single operating handle of the mechanism; the arrangement permitting a ready rewinding or returning of the slides to their original position preparatory to the next exhibition. The operation and manipulation of the apparatus being of so simple a nature as to afford the operator ample time for keeping the lamps in proper adjustment and condition, to rewind the kinetoscope film, and perform other duties ordinarily required on the part of an operator while exhibiting a combination of optical lantern views and motion pictures. To provide a simple and convenient arrangement of parts whereby a ready and rapid change can be effected from optical lantern views to motion pictures and vice versa, without disturbing the operative connections of the dissolving view shutter. To provide a simple and efficient construction whereby the maximum amount of illumination is available in the projection of motion pictures, and capable of ready change to suit the requirement in projecting lantern views. To provide a ready means for effecting the registration of the pair of stereopticon views and the motion picture views on the same spot on the screen. All as will hereinafter more fully appear.

In the accompanying drawings:—Figure 1, is a side elevation illustrating the general arrangement of the mechanism of the present invention. Fig. 2, is a plan view of the same. Fig. 3, is an enlarged fragmentary transverse sectional elevation or line $x$—$x$, Fig. 1. Fig. 4, is a detail longitudinal sectional elevation on line $x'$—$x'$, Fig. 3. Fig. 5, is a detail rear elevation of the stereopticon lens mount. Fig. 6, is a detail sectional elevation of the same on line $x^2$—$x^2$, Fig. 5. Fig. 7 is a detail side elevation of the dissolving view shutter mechanism from the side opposite to that shown in Fig. 1. Fig. 8, is a detail front elevation of the same. Fig. 9, is a detail front elevation of the front frame of the condensing lens box. Fig. 10, is a detail vertical section of same on line $x^3$—$x^3$, Fig. 9. Fig. 11, is a detail horizontal section of same on line $x^4$—$x^4$, Fig. 9. Fig. 12, is an enlarged detail longitudinal section of same on line $x^5$—$x^5$, Fig. 9.

Similar numerals of reference indicate like parts in the several views.

Referring to the drawings, 1 represents the base board of the apparatus, at the front end of which is mounted the kinetoscope 2, as shown.

3 are longitudinal tracks, preferably of the rod form shown, and secured to the upper surface of the aforesaid base board.

4 are transverse tracks, preferably supported on the tracks 3, and capable of longitudinal adjustment thereon.

5 is a lamp house mounted on the transverse tracks 4 and capable of transverse movement thereon to bring one of its lamps into line with the focal axis of the kinetoscope, or both of its lamps into line with the steropticon objectives, in the varied uses of the apparatus.

6 and 7 are a pair of lamp or illuminating apparatus preferably of the electric arc type, and preferably arranged within the single lamp house 5 in separated horizontal relation corresponding to the separated horizontal relation of the stereopticon objectives hereinafter described, and preferably in different vertical planes for convenience in changing carbons, effecting adjustments and other manipulations of the arc light mechanisms.

8 and 9 are the stereopticon objectives mounted in the manner hereinafter described on a supporting frame 10, which in turn is preferably supported by a lateral bracket arm 11 attached to the housing of the kinetoscope 2 as illustrated in Figs. 2, 5 and 6.

12 is a back frame secured to the front of the lamp house 5, and 13 is a front frame held in separated relation to said back frame by distance pieces 14 to form a space for containing the pairs of condensing lenses 15 and 16, for the passage of the flexibly connected slide carriers, and for the movement of the shutter operating mechanism hereinafter described in detail.

In the present construction each of the pairs of lamps 6, 7; stereopticon objectives 8, 9, and condensing lenses 15 and 16 are in longitudinal alinement to form two optical systems when the lamp house is in position for exhibiting stereopticon views; while the objective of the kinetoscope, the lamp 6 and condensing lens 15 are in longitudinal alinement when the lamp house is shifted laterally to exhibit moving pictures.

The series of picture slides used in connection with the present apparatus are connected together in the form of a flexible belt in manner hereinafter described in detail, and are alternately moved in front of the respective optical systems of the lamp house, and in connection with the concurrently operating dissolving shutter hereinafter described, attain the desired dissolving view effects in an automatic and continuous manner.

17 and 18 are upper and lower slide magazines secured to the lamp house 5, and moving therewith in its varied adjustments, and adapted to receive and deliver the two series of connected picture slides, above referred to, in the movement of the same past the optical systems of the lamp house.

19 and 20, are counterpart reels carried upon a pair of concentric shafts 21 and 22, the axis of rotation of which is at the upper end of a vertical standard 23 secured to the front of the lamp house 5. The said shafts overhang the lamp house and support the reels in a plane above the lamp house so as to take the series of picture slides from one of the aforesaid magazines, direct said slides past the focal axes of the two optical systems of the lamp house, and deliver said slides to the other magazines aforesaid. Each of the reels aforesaid consists of an outer series of rods constituting a skeleton reel drum and secured to individual spiders 24 and 25, which in the preferred form of the present invention are mounted loosely on the respective carrying shafts 21, 22, and adjustably connected by adjusting screws 26 to spider hubs 27 and 28 secured to the respective reel shafts 21, 22, the purpose being to permit an independent and limited turning adjustment of each reel to either raise or lower the series of picture slides in relation to the optical axes of the two respective optical systems in effecting a proper register of the two views on the same spot of the screen. The reel carrying shaft 21 aforesaid will be of a tubular form and journaled in a tubular neck on the standard 23, while the other shaft 22 will turn in the bore of said tubular shaft, and both shafts will be independently connected to their manually actuated operating mechanisms now to be described.

29 is a handled operating shaft journaled transversely in the standard 23 and carrying a gear wheel 30 which meshes with and drives a gear wheel 31 journaled on a stud or post on the standard 23 as shown.

32 are the driving members of pairs of intermittent gear connections of any usual type, preferably the Geneva single driving stud type shown. Said driving members are secured to opposite sides of the gear wheel 31 and gear with and drive the driven members 33 of the intermittent gear connections aforesaid, and which are individual to and fixedly secured to the respective reel carrying shaft 21 and 22. In the present construction the operating studs 34 of said intermittent connections are set diametrically opposite to each other so that when one stud is in engagement with a radial slot 35 of a driven member to impart movement thereto, the concentric and mutilated holding rim 36 of the other intermittent connection is in engagement with one of the peripheral holding recesses 37 of its driven member to maintain a stationary relation of said parts, and vice versa. As so constructed the operating shaft 29 will make a half revolution in the attainment of a quarter revolution of one or the other of the reel carrying shafts 21, 22, and said quarter revolutions of the reel shafts take place alternately and are of an intermittent nature in order to move fresh picture slides in proper relation to the respective optical systems of the stereopticon, and maintain such slides at rest during exposure.

The dissolving shutter heretofore referred to, has concurrent operation with the aforesaid mechanism for moving the picture slides and is operatively connected therewith as follows:—38, 38 and 39, 39, are pairs of crescent shaped shutter members individual to the respective stereopticon objectives 8 and 9 aforesaid, and preferably formed with serrations in their concave edges as shown in Fig. 8. 40 and 41, are a pair of connecting members pivoted to a bracket 42, on one of the lens mounts and at a point midway between the stereopticon objectives 8 and 9, as shown in Figs. 7 and 8. At its respective ends the member 40 is attached to one member of a pair of shutters 38 and 39, and in like manner the other member 41 is attached to the other members of said shutters, so that with a closing movement of one pair of shutters, a corresponding opening movement will be imposed on the other pair of shutters and vice versa, and the automatic movements of the shutters are attained by the following means:— 43 is an extensible rock shaft journaled in brackets on one of the objective mounts as shown in Figs. 1, 7 and 8, and carrying at its forward end a crank arm 44 having connecting links 45, which extend to and are pivotally connected to the aforesaid members 40, 41 at opposite sides of their pivot axis as shown in Fig. 8, so that a movement of said crank arm will impart simultaneous movement to said members in opposite directions. The rear end of the rock shaft 43, is operatively connected to the shaft 58, hereinafter described. 46 is a vertical yoke frame guided at its lower end in a socket sleeve on the standard 23 of the before described slide changing mechanism, and at its upper end by an elongated slot 47 embracing the manually actuated shaft 29 of said slide changing mechanism. 48 are upper and lower horizontal flanges at the upper end of the yoke frame and at opposite ends of the slot 47 aforesaid. 49 is an operating stud or pin on the side of the gear wheel 30, and adapted in its circular travel to engage one or the other of the aforesaid flanges 48 to impart an intermittent vertical reciprocation to the yoke frame 46 concurrently with the intermittent movements of the slide changing mechanism heretofore described. 50 is an intermediate lever operatively connected at one end to the yoke frame 46, and pivoted by a pivot screw 51 and elongated slot 52 to a bracket 53 secured in a laterally adjustable manner to the back frame 12 of the condenser lens mount by an attaching screw 54 and elongated slot 55 as shown in Fig. 3. The described construction affords a ready and accurate adjustment of the parts, and of the operating mechanism of the dissolving shutters, of which said lever 50 constitutes a part. 56, is a radius link pivoted to the frame 12 and to the other end of the lever 50 to impose movement on such lever end in a constant plane regardless of the adjustment of the lever and its accessories as above described. 57 is a connecting link extending from the point of connection of the lever 50 and radius link 56 to a crank arm on a rock shaft now to be described.

58 is an extensible and flexible rock shaft journaled at its rear end in the aforesaid frame 12, and at its forward end in the supporting frame 10 of the stereopticon objective, and operatively connected to the extensible rock shaft 42 before described.

59 is a crank arm on the rear end of the rock shaft 58, and to which the aforesaid link 57 is operatively connected.

In the drawings the extensible and flexible rock shafts are shown as formed of telescoping sections, and connected together by universal joints, any other ordinary form of extensible and flexible shafts may however be used without departing from the scope of this part of the present invention.

60 are intermediate carrier pieces secured in a horizontally adjustable manner to the supporting frame 10 of the stereopticon objectives by screws or studs 61 and elongated slots 62, and adapted to receive horizontal adjustments by adjusting screws 63 engaging lugs on the respective parts as shown in Figs. 2, 5 and 6.

64 are individual carrier plates to which the respective stereopticon objectives 8 and 9 are attached in any usual manner. Such carrier plates are secured in a vertically adjustable manner to the intermediate carrier pieces 60 by screws or studs 65 and elongated slots 66, and are adapted to receive vertical adjustments by adjusting screws 67 engaging lugs on the respective parts, as shown in Figs. 5 and 6.

In the construction shown, the front frame 13 of the condenser holding box aforesaid, is formed with a pair of vertically extending channels arranged symmetrical with the two optical systems of the lamp house as shown in Fig. 11, and adapted to receive and guide the two series of lantern slides before referred to. Said front frame is also formed with the usual light openings, in line with the condensers, and the required rectangular shape and size of said openings are attained in the case of the opening next adjacent to the kinetoscope by a plate or diaphragm 68 formed with a rectangular opening of the required size and hinged at its lower end to said frame, and within the usual hood 69 by which the rays of light are confined in their passage from the condenser to the stereopticon objective. The said plate is adapted to be swung down out of the path of the light rays when the optical system of the lamp house to which it belongs is employed in connection with the kinetoscope and with a view to the passage of the maximum amount of light for such use. In the case of the other opening in the aforesaid front frame 13, the shape and size of said opening is attained by a plate or diaphragm 70 formed with a rectangular opening of the required size and provided with upper and lower ears 71 by which it is secured to the frame 13 by attaching screws 72 in a manner which permits of limited vertical and transverse adjustments in order to attain a proper framing or register of the two series of picture slides upon the same spot on the screen. The limited adjustment of the plate 70 is attained by making the orifices in the ears of said plate and through which the attaching screws 72 pass, of a larger diameter than the shanks of said screws, as shown in Fig. 12.

The picture slides used in connection with the present apparatus are of the usual rectangular type and are connected together in the form of a flexible band by the series of hinge connections of any ordinary and suitable construction.

Having thus fully described my said invention what I claim as new and desire to secure by Letters Patent, is:—

1. In an optical projection apparatus for motion pictures and lantern views, the combination of a kinetoscope, a duplex stereopticon having a dissolving shutter mechanism and arranged in lateral relation to the kinetoscope, a transversely movable lamp house arranged at the rear of the kinetoscope and stereopticon objectives and adapted to be moved into line with the optical axis of either of the same, duplicate reel mechanism moving with the lamp house, two series of connected lantern slides carried by said reels, means for imparting alternating intermittent movement to said reels, and an operative connection between the reel actuating mechanism and the dissolving shutter mechanism.

2. In an optical projection apparatus for motion pictures and lantern views, the combination of a kinetoscope, a duplex stereopticon having a dissolving shutter mechanism and arranged in lateral relation to the kinetoscope, a transversely movable lamp house arranged at the rear of the kinetoscope and stereopticon objectives and adapted to be moved into line with the optical axis of either of the same, duplicate reel mechanisms moving with the lamp house, two series of connected lantern slides carried by said reels, means for imparting alternating intermittent movement to said reels, and a flexible and extensible operative connection between the reel actuating mechanism and the dissolving shutter mechanism.

3. In an optical projection apparatus, the combination of a pair of reels, concentric shafts carrying said reels, individual driven gears on said shafts, individual driving gears in operative engagement with said driven gears and a single operating shaft having operative engagement with said driving gears, the driven and driving gears being of an intermittent type and set one in advance of the other.

4. In an optical projection apparatus, the combination of a pair of reels, concentric shafts carrying said reels, individual driven gears on said shafts, individual driving gears in operative engagement with said driven gears and a single operating shaft having operative engagement with said driving gears, the driven and driving gears being of the Geneva type and set one in advance of the other.

5. In an optical projection apparatus, the combination of a pair of concentric carrying shafts, means for imparting alternating intermittent rotation to said shafts, individual reels carried on said shafts and having limited turning adjustment thereon, and adjusting means for effecting said adjustments.

6. In an optical projection apparatus for motion pictures and lantern views, the combination of a kinetoscope, a duplex stereopticon having a dissolving shutter mechanism and arranged in lateral relation to the kinetoscope, a transversely movable lamp house arranged at the rear of the kinetoscope and stereopticon objective and adapted to be moved into line with the optical axis of either of the same, duplicate reel mechanisms moving with the lamp house, two series of connected lantern slides carried by said reels, means for imparting alternating intermittent movement to said reels, and operative connection between the reel actuating mechanism and the dissolving shutter mechanism, and a pair of illuminating apparatus arranged within the lamp house in separated vertical and horizontal planes.

7. In an optical projecting apparatus, the combination of a kinetoscope, a stereopticon having two optical systems, an orificed diaphragm hinged in front of the condenser of one of the optical systems and adapted to be swung into and out of the light path of said system, and an orificed diaphragm disposed in front of the condenser of the other optical system and having limited vertical and lateral adjustment therein.

Signed at Chicago, Illinois, this 16th day of April, 1909.

ALVAH C. ROEBUCK.

Witnesses:
ROBERT BURNS,
HENRY MOE.